(12) United States Patent
Dry (10) Patent No.: US 9,821,769 B2
(45) Date of Patent: Nov. 21, 2017

(54) RANDOM SEED ENTRY NUMBER TO ELIMINATE KEY SEQUENCE CAPTURE

(71) Applicant: Ford Global Technologies, LLC, Dearborn, MI (US)

(72) Inventor: Alan George Dry, Gross Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 15/005,120

(22) Filed: Jan. 25, 2016

(65) Prior Publication Data
US 2017/0210339 A1    Jul. 27, 2017

(51) Int. Cl.
*B60R 25/23*    (2013.01)

(52) U.S. Cl.
CPC .................... *B60R 25/23* (2013.01)

(58) Field of Classification Search
CPC ...... G07C 9/00309; G07C 2009/00793; G07C 9/00174; G07C 2209/63; G07C 9/00944; G07C 2009/00261; G07C 2009/00507; G07C 2209/65
USPC ....................................................... 340/5.72
See application file for complete search history.

(56) References Cited

U.S. PATENT DOCUMENTS

| | | | |
|---|---|---|---|
| 5,055,701 A * | 10/1991 | Takeuchi ........... | G07C 9/00309 180/287 |
| 6,323,752 B1 | 11/2001 | Takizawa et al. | |
| 6,617,961 B1 * | 9/2003 | Janssen ................ | B60R 25/245 307/10.1 |
| 7,961,076 B2 * | 6/2011 | Kelley ................. | B60R 25/257 340/426.13 |

FOREIGN PATENT DOCUMENTS

| | | |
|---|---|---|
| CN | 104100145 A | 10/2014 |
| DE | 102004048983 A1 | 4/2006 |
| GB | 2309046 A | 7/1997 |

* cited by examiner

*Primary Examiner* — Mark Blouin
(74) *Attorney, Agent, or Firm* — Jason Rogers; Price Heneveld LLP (57) ABSTRACT

A vehicle entry system includes a lock mechanism, an interface, and a control. The control receives a plurality of code digits by presenting a displayed number on the interface that is initially a random number and at least one of changing or receiving an entry of the displayed number based on a signal from the input. When the plurality of code digits corresponds to a stored entry code, the control causes the lock mechanism to unlock.

18 Claims, 5 Drawing Sheets

RANDOM SEED ENTRY NUMBER TO ELIMINATE KEY SEQUENCE CAPTURE

FIELD OF THE INVENTION

The present invention generally relates to an access system for a vehicle. In particular, the system uses a single-digit display to facilitate code input based on adjustments to a random seed number.

BACKGROUND OF THE INVENTION

Vehicles have employed a number of different forms of keyless entry systems that can allow a user to lock or unlock a vehicle door without the use of a key and lock combination. Such systems can include remote controls and various forms of digital keypads. In general a digital keypad with buttons that correspond to one or more integer values that can be depressed in a sequence corresponding to a known access code. Most often, the values of the buttons are fixed, meaning that an observer can determine the code being entered by tracking the sequence of buttons pressed by a user accessing the vehicle. Other forms of digital code entry may also be susceptible to code determination by observing any fixed sequences that they employ for gaining access to a vehicle. Accordingly, further advances may be desired.

SUMMARY OF THE INVENTION

According to one aspect of the present invention, a vehicle entry system includes a lock mechanism, an interface, and a control. The control receives a plurality of code digits by presenting a displayed number on the interface that is initially a random number and at least one of changing or receiving an entry of the displayed number based on a signal from the input. When the plurality of code digits corresponds to a stored entry code, the control causes the lock mechanism to unlock.

According to another aspect of the present invention, a vehicle includes a door having a lock mechanism, an interface mounted on the door, and a control. The control receives a plurality of code digits by presenting a displayed number on the interface that is initially a random number and at least one of changing or receiving an entry of the displayed number based on a signal from the input. When the plurality of code digits corresponds to a stored entry code, the control causes the lock mechanism to unlock.

According to another aspect of the present invention, a method for controlling access to a vehicle includes presenting on an interface a first displayed number that is initially a first random number and at least one of changing or receiving an entry of the first displayed number based on a signal from an input. The method further includes, upon receiving the entry of the first displayed number, presenting a second displayed number on the interface that is initially a second random number.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
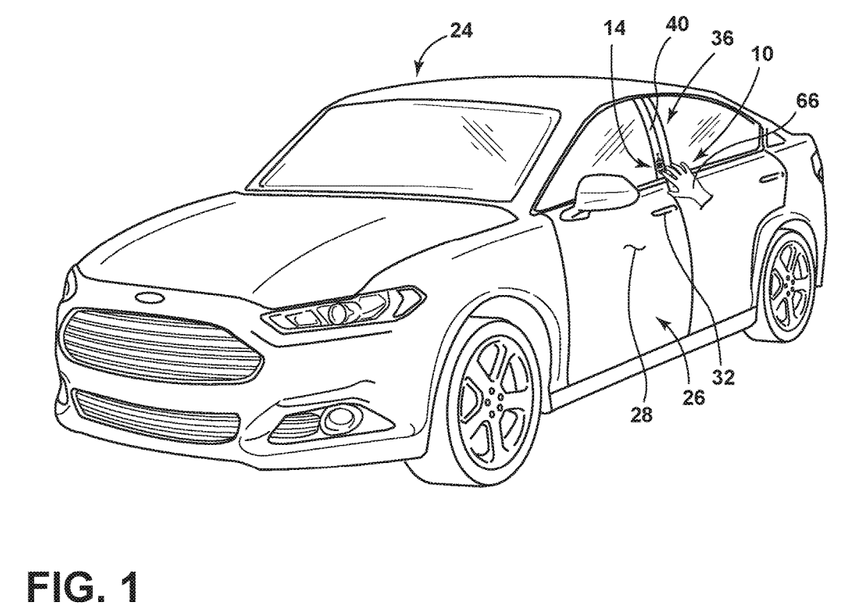
FIG. 1 is a front-perspective view of a vehicle including an entry system according to the present disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates a vehicle entry system. Vehicle entry system 10 includes a lock mechanism 12, an interface 14, and a control 16. The control 16 receives a plurality of code digits 18 by presenting a designated displayed number 20 on the interface 14. The display number is initially a random number, and the control subsequently either changes the displayed number or receives a command to enter the displayed number 20 as one of the plurality of code digits 18 based on a signal from the interface 14. When the plurality of code digits 18 corresponds to a stored entry code 22, the control 16 causes the lock mechanism 12 to unlock.

As shown in FIG. 1, the vehicle entry system 10 can be included in a vehicle 24 having a door 26 with lock mechanism 12 operably coupled therewith. As further shown, interface 14 is mounted on door 26 such that interface 14 is accessible to a user of vehicle 24 to gain access to interior of vehicle 24 by inputting the above-mentioned plurality of code digits 18 to correspond to the stored entry code 22.

Figure 2:
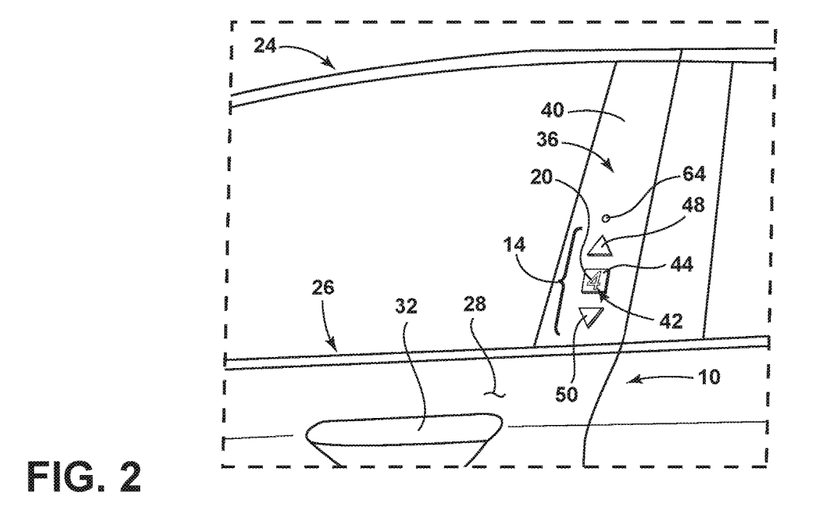
FIG. 2 is a detail view of a portion of the vehicle of FIG. 1 showing an input included in the entry system.
Figure 3:
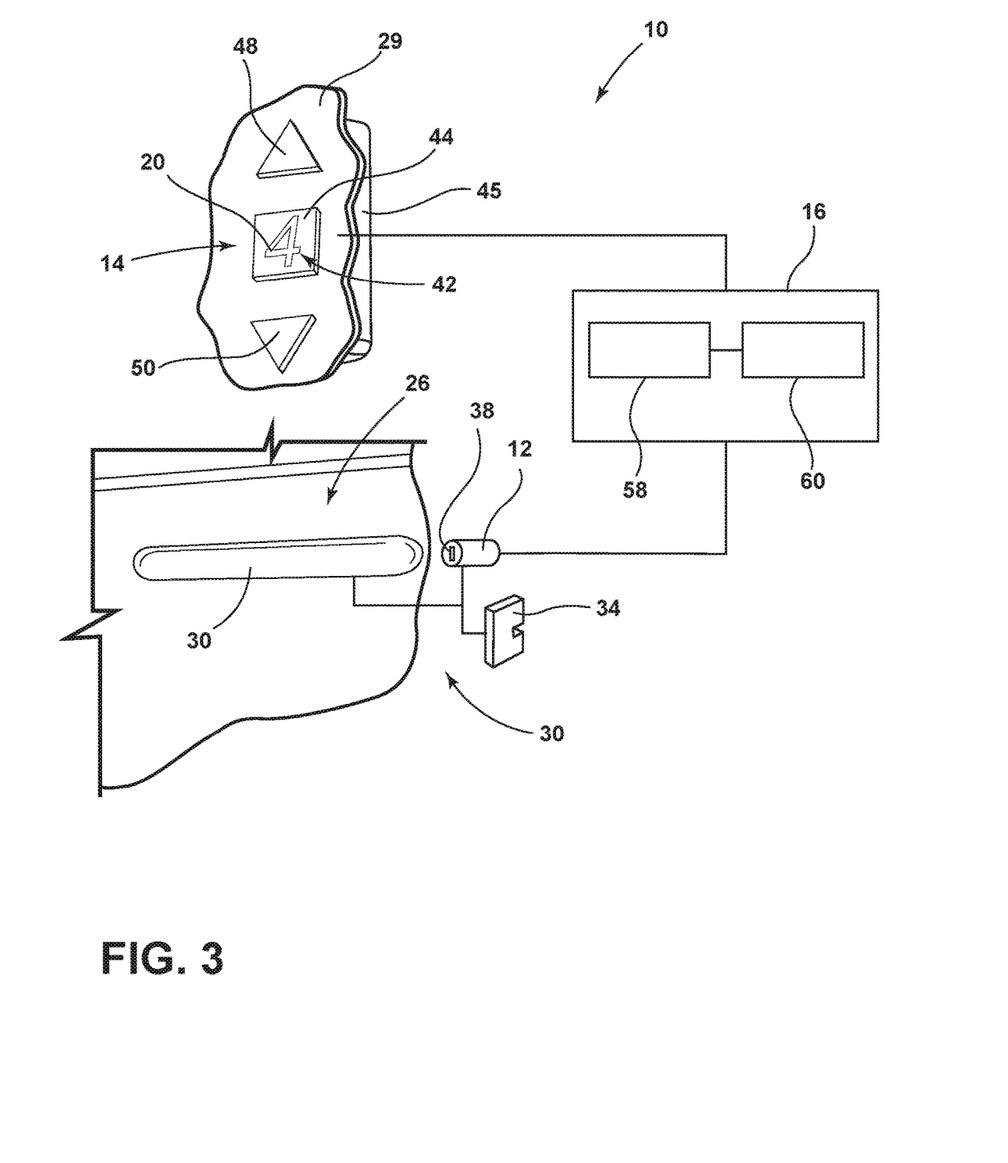
FIG. 3 is a schematic diagram of the system of the present disclosure.

As further shown in FIGS. 2 and 3, door 26 can define an exterior surface 28 and an interior 30, such interior 30 being generally defined between the exterior surface 28 and the trim pieces or cladding applied opposite the exterior surface 28 and positioned toward the interior of vehicle 24. In particular, as shown in FIG. 3, the lock mechanism 12 may be operably coupled with at least one of a door handle 32 that is exposed on the exterior surface 28 of door 26. Lock mechanism 12 may additionally or alternatively be coupled with a latch mechanism 34 that may be positioned within the interior 30 of door 26 or may be at least partially exposed on a portion of exterior surface 28 that faces toward the B-pillar 36 of vehicle 24 where it may engage with a mating portion thereof anchored to B-pillar 36 to maintain door 26 in a closed position. Accordingly, lock mechanism 12 may be operable to maintain latch mechanism 34 in a condition such that manipulation of handle 32 does not disengage latch mechanism 34 from the mating portion thereof, thereby maintaining door 26 in a closed position, as shown in FIG. 1. In this manner, latch mechanism 34 may disengage the operable portions thereof from handle 32, forcibly secure such portions in place, or both. As further shown, lock mechanism 12 may include a key receptacle 38 exposed on exterior surface 28 of door 26, such that a user may unlock door 26 using a key. Alternatively, lock mechanism 12 may positioned fully within interior 30 of door 26, thereby relying on interface 14, as described further herein, to gain access to vehicle 24.

As shown in FIG. 2, the above-described interface 14 for system 10 may be positioned on the exterior surface 28 of door 26 such that convenient access thereto can be gained by a user. In the present example, interface 14 is positioned along a trim piece 40 that defines a portion of exterior surface 28 on door 26 in an area overlying the B-pillar 36 when door 26 is in the closed position shown in FIG. 1. Other positions for interface 14 are possible, including along other portions of door 26. As shown, interface 14 includes a display 42 for presenting the displayed number 20 so as to be visible by the user when standing adjacent door 26. In the present example, display 42 may be incorporated into or may underlie a confirmation button 44 that can be used to make the above-mentioned entry of the displayed number by sending an appropriate signal from confirmation button 44 to control 16. In other embodiments, the confirmation button 44 may be fixed relative to the adjacent exterior surface 28 of door 26, and interface 14 may include a separate confirmation button 44 adjacent to display 42, for example. In the present example, confirmation button 44 may have an exterior portion 46 that is generally clear such that display 42 is visible therethrough. Display 42 may be fixed with door 26, such as with a support portion 45 for interface 14 within door 26, or may be moveably mounted to exterior portion 46 of confirmation button 44. Further, display 42 may be a digital display, such as an LCD or LED digital display adapted for presenting integers 0-9 thereon. In other examples, display 42 may a video screen or the like, including a thin film transistor ("TFT") display, or the like. In another embodiment, confirmation button 44 can be integrated with display 42 in the form of a touch screen or otherwise touch-sensitive display (e.g. a capacitive or resistive touch screen) element within the corresponding exterior surface 28 of door 26.

As further shown in FIGS. 2 and 3, interface 14 can further include one or more selection buttons 48,50 adjacent to confirmation button 44. In the example shown in the Figures, two selection buttons 48,50 are shown in the form of a value-increase selection button 48 and value-decrease selection button 50 that are configured as generally arrow-shaped buttons directed, respectively, in the upward and downward directions. In this manner, buttons 48,50 themselves can indicate the function thereof, namely to respectively increase or decrease the value of the displayed number 20. Accordingly, when one of the respective selection buttons 48 or 50 is depressed by a user, interface 14 can transmit a signal to control 16 to correspondingly change the displayed number 20 by changing the displayed number 20 a sequentially-adjacent integer with either a greater or lesser value. In the example illustrated in FIG. 3, the displayed number 20 is the number four, which can be increased to be sequentially-adjacent greater integer five by depressing the value increase selection button 48. Similarly, the displayed number 20 can be decreased to the sequentially-adjacent lesser value of three by depressing the down selection button 50.

Figure 4:
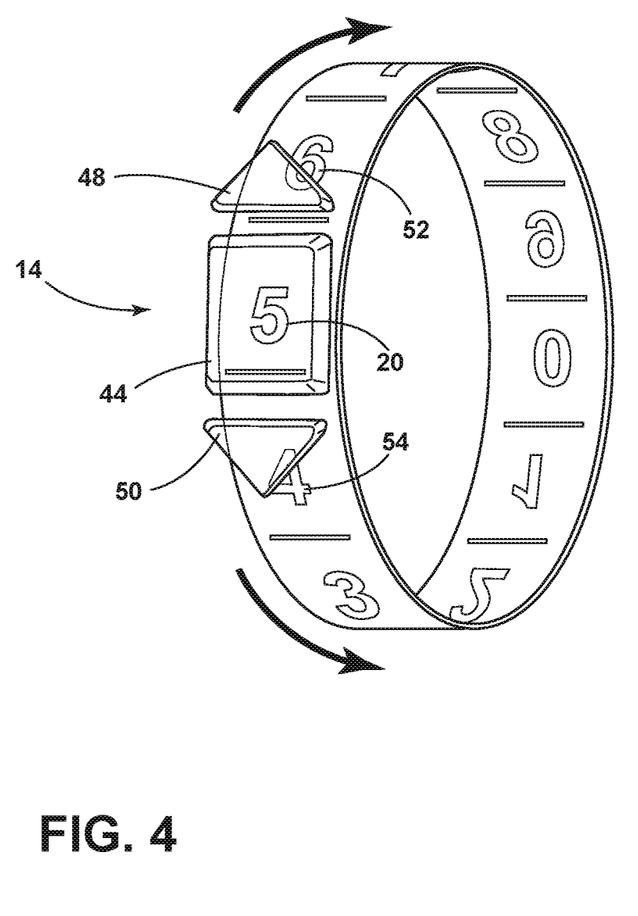
FIG. 4 is a conceptual diagram showing an input mode for entry of a code digit using in input of the system.

An example of an operating scheme for continued changing of the value of the displayed number 20 in response further use of the value increase selection button 48 and the value decrease selection button 50 is conceptually illustrated in FIG. 4. In such a scheme, the integers zero to nine can be available for selection as a displayed number 20 and, accordingly entered as code digits 18 in order to enter an entry code for vehicle 24, as described further below. Further, selection buttons 48 and 50 can be used to cycle through such values in a recursive manner such that, for example, when the highest available value (e.g. nine, as illustrated in FIG. 4) is displayed, additional actuation of the value-increase selection button 48 can cause control 16 to cycle the displayed number 22 the lowest available value (e.g. zero, in the example shown in FIG. 4). Similarly, when the displayed number 20 corresponds to the lowest-available value (e.g. zero, in the example of FIG. 4) additional actuation of the value-decrease selection button 50 can cause control 16 to present on display 42 as a refreshed display number 20, the highest-available value (e.g. nine in the example of FIG. 4). In this manner, a variation of interface 14 could include only a single selection button that could be either a value increase selection button 48 or value decrease selection button 50. However, by providing selection buttons 48, 50 that both increase and decrease the value of displayed number 20, additional user-convenience may be achieved. Further, additional or fewer integers may be available as selectable values for displayed number 20 depending on factors such as, for example, the desired security level for stored code 22 and/or user convenience.

Figure 5A:
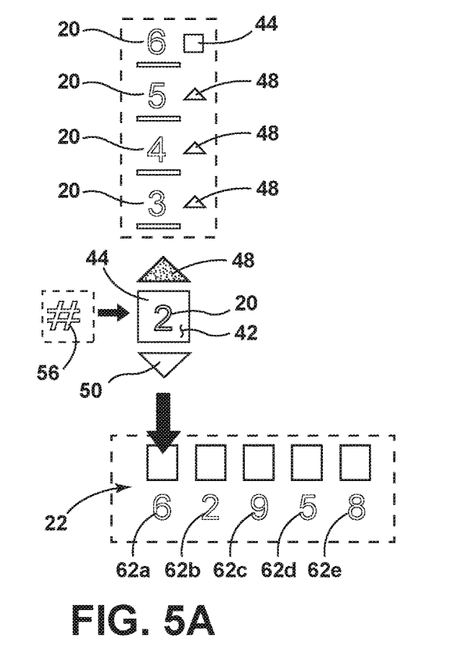
FIGS. 5A-5D show conceptual diagrams of successive steps of entry of a code into the present system.
Figure 5B:
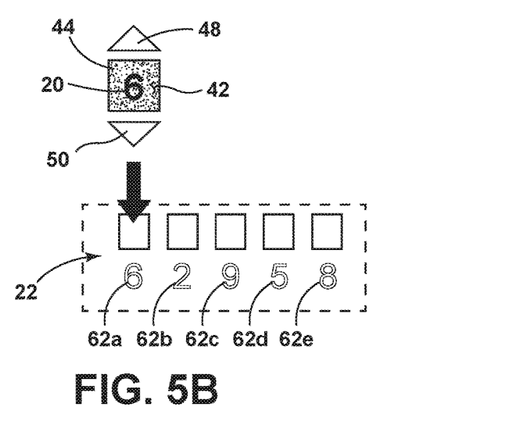

The particular example for entry of a sequence of code digits 18 using interface 14 is illustrated in FIGS. 5A-5D. In such an example, stored code 22 corresponds to a particular sequence of five integer-values selected from the integers zero to nine, and is selected as 6-2-9-5-8. Such a stored code 22 is used for exemplarily purposes only and can, in one example be comprised of five-digit code of single-digit integers. In other examples, more or fewer digits can be used for the overall code and, similarly, more or fewer available integers can be selected for each individual digit. As illustrated in FIG. 5A control 16 may select a random number as a "seed" value for displayed number 20. With reference to FIG. 3, random number 56 may be generated by logic 58 within control 16 and stored in memory 60 as displayed number 20, as will be described further below. Subsequently, control 16 can direct system 10 to present the random number 56, stored as displayed number 20, on display 42. In the present example, the initial random number 56 and, accordingly, displayed number 20 is the integer two. As further illustrated in FIG. 5A the first stored code digit 62a is the integer six. Accordingly, a user can actuate one of value increase selection button 48 and value decrease button 50 to change the value of the displayed number 20, as discussed above, to arrive at the correct value for the first stored code digit 62a, of which the particular user is aware.

Figure 5C:
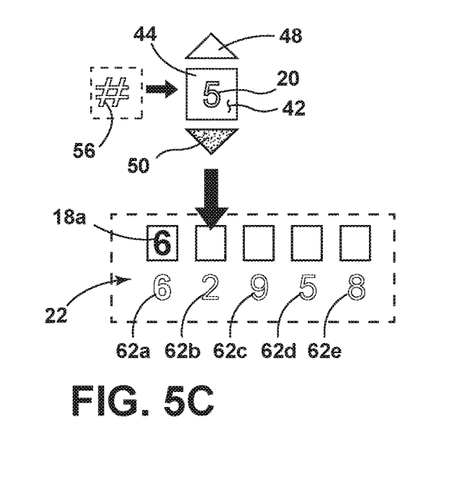

In the example shown, the value increase selection button 48 is used to sequentially change displayed number 20 to the numbers three, four, five, and then the desired number six. As further illustrated in FIG. 5B, when the displayed number 20 matches the known correct first stored code digit 62a, the user can actuate confirmation button 44, thereby sending a signal to control 16 to enter the displayed number 20 as the first code digit 18a. As discussed further below, if the entered first code digit 18a matches the first stored code digit 62a, controller 16 can maintain first code digit 18a in memory 60 and prepare to receive entry of a subsequent (e.g. second) code digit 18b, as illustrated in FIG. 5C. In this manner, control 16 can store a second random 56 in memory 60 as a new displayed number 20. In the example shown, the random number 56 generated is the number five, which is, accordingly, presented on display 42. In a similar manner to that which is discussed above, the user can manipulate, for example, value-decrease selection button 50 change the value of the displayed number 20 to correspond to the correct value for the second stored code digit 62b.

Figure 5D:
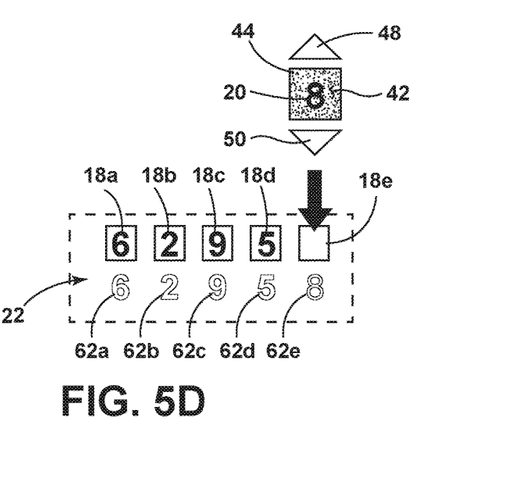

Again, once the desired value for the second code digit 18b is shown as displayed number 20, the user can depress confirmation button 44, thereby directing control 16 to store the displayed number 20 as the second code digit 18b. The user continues to enter code digits 18c and 18d, for example, with control 16 presenting an initial random seed number 56 as successive displayed number 20. Upon entry of code digits 18c,18d that correspond to the respective stored code digits 62c,62d, the entry sequence reaches entry of the last code digit 18e. Subsequently, as shown in FIG. 5D, when the displayed number 20 corresponds to the desired entry for code digit 18e, the user can depress confirmation button 44, thereby entering displayed number 20 into memory 60 as code digit 18e, which is compared to the respective stored code digit 62e. If control 16 determines that each of the entered code digits 18a,18b,18c,18d matches the respective stored code digits 62a,62b,62c,62d,62e, then control 16 can cause lock mechanism 12 to move to an unlocked such that the user can open door 26 using, for example, handle 32.

By initially presenting the displayed number 20 as a random seed number 56 upon each new code digit 18 entry sequence, the code will be entered using a different sequence of actuation of selection buttons 48,50 and entry button 44 each time the code is entered. In this manner, an observer, seeing the sequence of buttons used to enter the code, but not the code itself, is unable to discern the code by duplicating the same entry sequence. Further, by using a new random seed number 56 for each individual code digit 18, trial-and-error approaches are practically eliminated.

Figure 6:
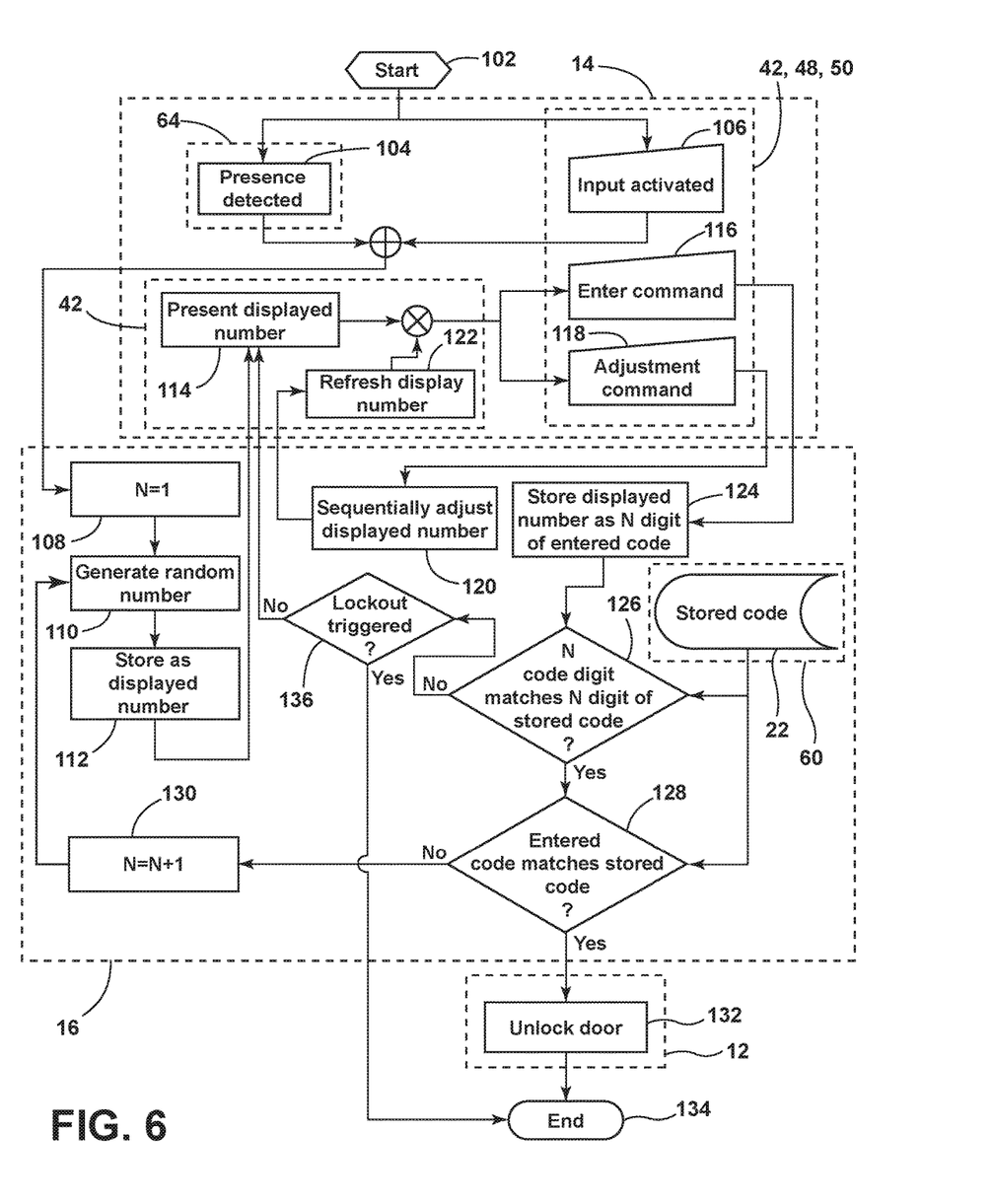
FIG. 6 is a flowchart showing a scheme by which the present system can receive an entered code and selectively grant access to the associated vehicle by a comparison of the entered code digits to respective digits of a stored code.

The method employed by system 10 to receive entry of code digits 18 and comparison thereof to various stored code digits 62 is shown in further detail in FIG. 6, in which the method starts at step 102 with system 10 waiting for the code entry sequence to be initiated by a user. As shown in step 104 such initiation may be triggered by the use of a proximity sensor 64 (as illustrated in FIGS. 1 and 2) which may detect the presence of an object 66 that may, in an example, be the hand of a user, in the area of interface 14. Proximity sensor 64 can be in communication with control 16 to transmit a signal thereto when an object is detected within the range of proximity sensor 64 with the logic 58 directing control 16 to initiate the code entry process. Alternatively, the sequence may be initiated by the user depressing any of the buttons on interface 14, such as confirmation 44 of selections buttons 48, 50. At such a point in step 108, the sequence may be started or rest by setting a sequence variable, designated as N, which may correspond to both the code digit 18 being entered as well as the stored code digit 62 to which the code digit 18 is compared.

Subsequently, in step 110 logic 58, or an additional component of control 16, may generate random number 56, which is stored as display number 20 in memory 60 (step 112). In step 114 control 16 presents displayed number 20 on display 42. Subsequently, control 16 awaits for the receipt of a command from a user by interface 14. In particular, the user can input either an enter command (step 116) using confirmation button 44, or an adjustment commend (step 118) using one of the selection buttons 48,50. As illustrated, if an adjustment command (step 118) is entered, control 16, in step 120, will adjust display number in the direction corresponding to the particular selection button 48 or 50 depressed, as discussed above. In step 122 control 16 will then refresh displayed number 20 to the adjusted value and await for a further command according to step 116 or step 118.

When the user has utilized adjustment commands (step 118) to arrive at the desired value for the corresponding code digit 18, the user can then utilize the "enter" command (step 116) to direct control 16 to store displayed number 20 as the corresponding stored code digit 62 (step 124). The controller 16 can then access the stored code 22 in memory 60 and compare the corresponding code digit 18 with the appropriate stored code digit 62 (step 126). If a match is determined in step 126, controller 16 then determines if the complete code has been entered in 128. If the complete code has not been entered, then the logic value is increased by one in step 130 and a new random number 56 is generated. The random number 56 is then stored as displayed number 20 and presented on display 42 for an entry of a subsequent code digit 18 according to steps 116 through 126. When control 16 determines, in step 128, that a complete code of correct code digits 18 has been entered, control 16 can unlock door 26 by the above-described manipulation of lock mechanism 12. The sequence can then end in step 134 by deactivation of interface 14, for example.

Returning to step 126, if control 16 determines that a particular code digit 18 does not match the corresponding stored code digit 62, control 16 can determine if a lockout has been triggered in step 136. In an example, a lockout can cause deactivation of interface 14 (step 134) and can be triggered by, for example, one or more incorrect code digits 18 being entered. In various examples, control 16 can keep track of incorrect entries throughout the entire entry of the required number of code digits 18, allowing only a predetermined number of incorrect entries (e.g. one, two, or three), including, for example, a lower number of incorrect entries for a single logic value (e.g. a single code digit 18). If the lockout has not been triggered in step 136, control 16 can continue to present the displayed number 20 in step 114 and can proceed to allow the user to adjust or enter the displayed number 20 according to steps 116-124. In some embodiments, control 16 may cause display 42 to provide an indication that an incorrect code digit 18 has been entered, including, for example, an audible tone, brief dimming, or deactivation and reactivation of display 42, or the like.

The above-described scheme can be used to unlock door 26, alone, or to unlock two or more of the vehicle doors, (for example, both the driver-side and passenger-side front vehicle doors) or all of the doors of the vehicle 24. In various examples, a control system of vehicle 24 can allow a user to control various options corresponding to the desired effect of entry of a correct sequence of code digits 18 corresponding to a stored code 22 in this manner.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle entry system, comprising:
   a lock mechanism;
   an interface including a display; and
   a control:
     receiving a plurality of code digits by initially presenting a random number as displayed number on the display and at least one of changing or receiving an entry of the displayed number based on a signal from the interface; and
     when the plurality of code digits corresponds to a stored entry code, causing the lock mechanism to unlock.

2. The vehicle entry system of claim 1, wherein:
   the interface includes a confirmation button and a selection button;
   the signal received by the controller from the interface corresponds with changing the displayed number when the selection button is depressed; and
   the signal received by the controller from the interface corresponds with receiving the entry of the displayed number when the confirmation button is depressed.

3. The vehicle entry system of claim 1, wherein:
   the display is on a portion of a confirmation button; and
   the signal received by the controller from the interface corresponds with receiving the entry of the displayed number when the confirmation button is depressed.

4. The vehicle entry system of claim 1, wherein:
   the controller receives a first one of the plurality of code digits including presenting the displayed number in the form of a first displayed number on the interface that is initially the random number in the form of a first random number; and
   upon receiving the entry of the displayed number based on the signal from the interface in the form of a first signal, the controller receives a second one of the plurality of code digits including presenting a second displayed number on the interface that is initially a second random number at least one of changing or receiving the entry of the second displayed number based on a second signal from the interface.

5. The vehicle entry system of claim 1, further including a proximity sensor in communication with the controller, wherein:
   the controller presents the displayed number on the interface upon detecting a first object within a first range of the proximity sensor.

6. The vehicle entry system of claim 1, further including a first vehicle door defining an exterior surface and an interior, wherein;
   the interface is mounted on the exterior of the vehicle door; and
   the door lock mechanism is mounted within the interior of the vehicle door.

7. The vehicle entry system of claim 6, wherein:
   the exterior surface includes a portion thereof defined on a B-pillar trim piece of the door; and
   the interface is mounted on the exterior of the vehicle door on the portion defined on the B-pillar trim piece.

8. A vehicle, comprising:
   a door including a lock mechanism;
   an interface mounted on the door; and
   a control:
     receiving a plurality of code digits by initially presenting a random number as a displayed number on the interface and at least one of changing the displayed number to a sequentially-adjacent integer or storing the displayed number based on a signal from the interface; and
     when the plurality of code digits corresponds to a stored entry code, causing the lock mechanism to unlock.

9. The vehicle of claim 8, wherein:
   the interface includes an increase selection button and a decrease selection button; and
   changing the displayed number includes increasing the displayed number to a greater sequentially-adjacent integer upon receiving the signal from the increase selection button or decreasing the displayed number to a lesser sequentially-adjacent integer upon receiving the signal from the decrease selection button.

10. The vehicle of claim 8, wherein:
    the interface includes a confirmation button and a selection button;

the signal received by the controller from the interface corresponds with changing the selection of the displayed number when the selection button is depressed; and the signal received by the controller from the interface corresponds with receiving the entry of the displayed number when the confirmation button is depressed.

11. The vehicle of claim 8, wherein:

the controller receives a first one of the plurality of code digits including presenting the displayed number in the form of a first displayed number on the interface that is initially the random number in the form of a first random number; and upon receiving the entry of the displayed number as a first entry based on the signal from the interface in the form of a first signal, the controller receives a second one of the plurality of code digits including presenting a second displayed number on the interface that is initially a second random number at least one of changing or receiving a second entry of the second displayed number based on a second signal from the interface.

12. The vehicle of claim 8, further including a proximity sensor in communication with the controller, wherein:

the controller presents the displayed number on the interface upon detecting a first object within a first range of the proximity sensor.

13. A method for controlling access to a vehicle, comprising:

presenting on an interface a first displayed number that is initially a first random number and at least one of changing or receiving an entry of the first displayed number based on a signal from an interface; and upon receiving the entry of the first displayed number, presenting a second displayed number on the interface that is initially a second random number.

14. The method of claim 13, further including:

storing in memory entries of at least the first and second displayed numbers as a plurality of sequential code digits; and when the plurality of code digits corresponds to a stored entry code, causing a lock mechanism to unlock.

15. The method of claim 13, wherein presenting a second displayed number on the interface that is initially a second random number further includes at least one of changing or receiving an entry of the second displayed number based on a second signal from the interface.

16. The method of claim 13, wherein changing the displayed number includes changing the displayed number to a sequentially-adjacent integer.

17. The method of claim 13, wherein:

changing the displayed number includes increasing the displayed number to a greater sequentially-adjacent integer upon receiving a signal from an increase selection input or decreasing the displayed number to a lesser sequentially-adjacent integer when the signal corresponds to a decrease selection input.

18. The method of claim 13, further including initiating a code entry sequence, including presenting on the interface the first displayed number, upon detecting an object within a first range of the interface.

* * * * *